② United States Patent [19]
Busch et al.

[11] Patent Number: 4,806,088
[45] Date of Patent: Feb. 21, 1989

[54] APPARATUS FOR THE PRODUCTION OF EXPANDED CUSHIONS WITH A TEXTILE COVER

[75] Inventors: Ralf Busch, Cologne; Volker Onnenberg, Wiehl-Drabenderhoehe, both of Fed. Rep. of Germany

[73] Assignee: Bayer Aktiengesellschaft, Leverkusen, Fed. Rep. of Germany

[21] Appl. No.: 65,986

[22] Filed: Jun. 24, 1987

[30] Foreign Application Priority Data

Jul. 9, 1986 [DE] Fed. Rep. of Germany ....... 3622971

[51] Int. Cl.$^{4}$ ............................................... A23G 1/20
[52] U.S. Cl. .................................... 425/127; 425/385; 425/466; 425/817 R; 425/405.1; 249/83; 264/46.8
[58] Field of Search ........... 425/125, 127, 4 R, 405 R, 425/817 R, 385, 466; 249/83; 264/46.6, 46.8

[56] References Cited

U.S. PATENT DOCUMENTS 3,864,206 2/1975 Linderoth .......................... 264/46.6
3,942,926 3/1976 Bulloch ............................... 425/127
3,943,215 3/1976 Grunc et al. .................... 425/817 R

FOREIGN PATENT DOCUMENTS 3613879 4/1987 Fed. Rep. of Germany .
2572015 4/1986 France .
1353466 5/1974 United Kingdom .

*Primary Examiner*—Bernard Nozick
*Attorney, Agent, or Firm*—Gene Harsh; Joseph C. Gil; Thomas W. Roy

[57] ABSTRACT

The present invention is directed to an apparatus for the production of foam cushions having a textile cover in which the cover is inserted into a mold cavity and adapted to the contour of the mold cavity by the application of a vacuum wherein movable gates assist in improving the adaptation of the cover to the contour of the mold cavity.

6 Claims, 3 Drawing Sheets

APPARATUS FOR THE PRODUCTION OF EXPANDED CUSHIONS WITH A TEXTILE COVER

BACKGROUND OF THE INVENTION

1. Field of the Invention

The invention relates to an apparatus for the production of foam cushions with a textile cover, in particular of seat cushions for motor vehicles, in which the cover is inserted into the mold cavity of a form tool and is adapted to the contour of the mold cavity by the application of a vacuum and subsequently a foam-forming reaction mixture is introduced.

2. Description of the Prior Art

The introduction of a cover into a mold cavity without forming undesirable creases such that it fits against the wall and the gates of the mold cavity in conformity with the contour, as well as, optionally, the insertion of folds which are desired at particular points, for example, the cushion corners, is still a problem, especially in cover materials which are not elastic. However, in elastic materials difficulties also arise because apart from the formation of undesirable ceases, overstretching of the covering can also occur. The covering is overstretched mostly at exposed points such as edges, ridges, corners, etc., and causes premature wear of the cushion cover. For this reason attempts have already been made to use a top ram apart from the usual tentering frames, to press the cover into the mold cavity in order to improve the introduction of the cover. In this process the risk of damage to the cover and/or any sealing sheeting which might have been placed on its underside exists. As is the case in all stamping or pressing devices the danger of injuries also exists to the operators during movement of the top ram. The ability to exactly reproduce the insertion process presents problems. A special top ram is required for each form tool because the top ram must be adapted to the contour of the mold cavity at least approximately. It is also disadvantageous that the fitting procedure is not visible because of the top ram.

The object of the present invention is to provide a process and a device for the production of foam cushions in which the feeding of the cover into the mold cavity is improved with respect to exactness, the time spent and safety of the operators. This object is achieved in accordance with the present invention by the use of movable gates.

SUMMARY OF THE INVENTION

The present invention is directed to a process for the production of a foam cushion having a textile cover by inserting the textile cover into the mold cavity of a form tool, such that movable gates are present in the mold cavity at the time the textile cover is inserted, applying a vacuum through holes in the mold cavity in order to adapt the textile cover to the contours of the mold cavity, withdrawing the gates either during and/or after the vacuum shaping of the cover and finally introducing a foamable reaction mixture into the mold cavity.

The present invention is also directed to an apparatus for the production of foam cushions having a cover which has means for introducing a foamable reaction mixture into a form tool, a form tool which comprises a mold cavity, the mold cavity having holes which are connected to means for generating a vacuum, and wherein the mold cavity has one or more gates which are movable.

BRIEF DESCRIPTION OF THE DRAWINGS

In the drawing the new device is represented purely diagrammatically in several embodiments and described in greater detail in the following.

DETAILED DESCRIPTION OF THE INVENTION

Figure 1:
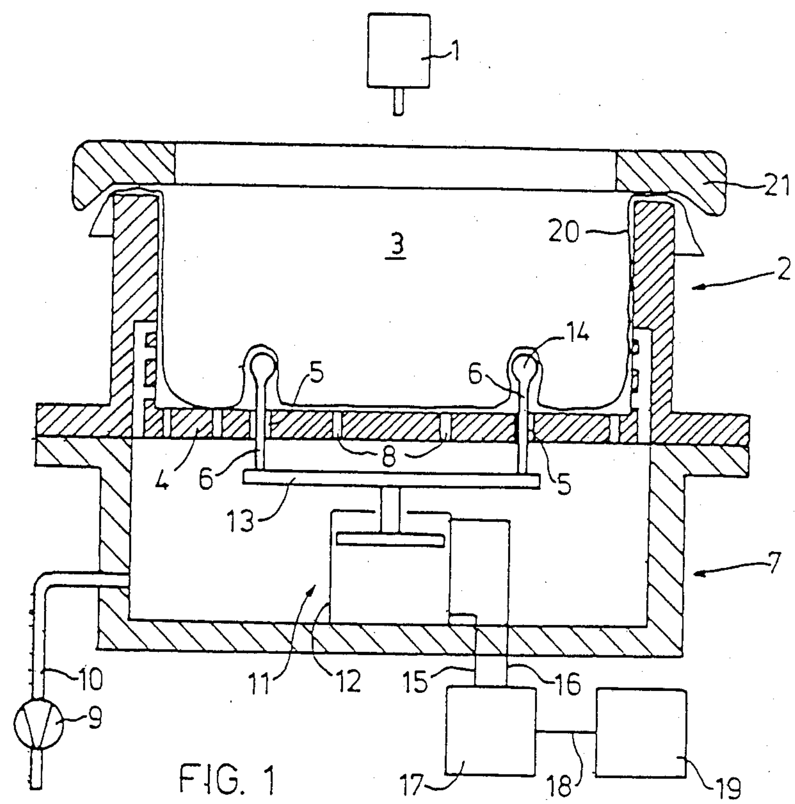
FIG. 1 represents a sectional view of the apparatus according to a first embodiment.

The gates initially project a relatively long way into the mold cavity and cause a certain tension of the cover to be maintained when it is inserted. It is not until the gates are withdrawn that the other cavities which remain between the mold cavity wall and the cover are displaced by the introduction and withdrawal of the gates such that the mold wall and the gates later conform to the mold in accordance with their final position on the finished cushion. It is self-evident that the dimensioning of the gates, the degree of motion and their speed of motion depend on a large number of factors which must be taken into account such as the size of the mold part, the rigidity and/or stretchability of the cover, the strength of the vacuum applied, the friction on the mold wall, the use of a tentering frame, etc. The specialist is indeed familiar with certain tendencies which can be taken into account from the outset in the layout of the form tool and/or in the planning of the process. Optimization, in particular in cushions which are molded geometrically with difficulty, is only possible by trials in the final analysis. If sufficient experimental values are available, optimization for new applications can be effected with the aid of a computer.

The gates have, for example, the shape of flat panels, they can even be contoured spatially within certain limits and/or have a certain degree of elasticity. According to a particular embodiment of the process, the gates are moved back until the cover rests on these gates essentially without pressure.

It has in fact become clear that, as a rule, the moment of optimal contour adaptation occurs when the cover no longer presses onto the upper edge of the gate. If the gates are taken back slightly too far no disadvantages arise since the rigidity of the cover normally fixes the contour even without complete support.

The motion of the gates takes place according to another variant of the process in a linear manner and/or around an axis. The type of motion that is selected depends on which type guarantees the best end result in a given case. In particular, for the intended insertion of creases at the corners of the cushion which is to be finished where a surplus of a cover material is present, gates which are pivoted around a transverse axis can be used.

It is self-evident that the gates can be moved individually, in groups, at the same time or staggered over time and at the same speed or at different speeds. Here, too, the specialist will have to select the optimal conditions in each case in accordance with the geometry of the mold part based on his experience and based on trials.

According to another embodiment of the process tubular cavities are molded. Cavities of this kind enable the cushion to be better aerated and also are conducive to the creation of zones of different flexibility in cases of appropriate geometry and arrangement, whereby the comfort of the seating is improved. On account of the undercuts a cushion of this nature is indeed more difficult to remove from the mold; however, no fundamental problems exist on account of the elasticity in the case of soft foam cores.

The device for the production of foam cushions with a cover, in particular, of seat cushions for motor vehicles, emanates from a mix head and a form tool, wherein the mold cavity has gates and can be connected to a vacuum generator by means of aspirating holes.

What is new is the fact that the gates are arranged in such a way that they are movable. Whereas the gates which are arranged in a rigid manner, as have been known up to now, only had the object of contouring, the movable gates additionally have the object of guaranteeing improved insertion of the cover in the mold cavity to conform with the contour. Gates can also be provided whose main purpose is not to contour. These gates can be drawn back so far that they form a surface with the mold cavity wall and/or the mold cavity floor. It is apparent that, in the usual manner, an additional tentering frame can be provided for the introduction of the cover if this seems to be advantageous.

According to an initial embodiment a common gear is allocated to the gates. It preferably operates hydraulically: however, gears which operate pneumatically, mechanically or electromagnetically may also be used.

Preferably the gear is coupled to a control device so that the gates can be movable together, in groups or individually. In this manner the process of inserting the cover with respect to the motion of the gates can take place according to the prescribed program.

The gates are preferably inserted through slits arranged in the wall of the form tool. "Wall" is defined broadly enough to include the floor of the form tool in this case. As far as possible, the gear of the gates should be arranged in the suction box which is allocated to the form tool, since no special sealing is then required. It is precisely in the area of the gates that the presence of aspirating holes is in fact desirable, with the result that the slits can serve as aspirating holes at the same time. The gates are guided in a linear manner, run on bearings and/or they are mounted on a swivelling axis. This means that a combination between a linearly guided bearing and swivel bearing is also possible. The swivelling axes can be provided, in this instance, transversely or in the longitudinal direction of the gates.

In particular cases the gates are run on bearings in such a way that they can swivel around a longitudinal axis in the mold cavity. The capacity of swivelling around a longitudinal axis makes it possible for the cover to be supported flatly when the gate is moved, in contrast to the linear support provided when the gate is movable in a linear manner or when it is movable around a transverse axis. The surface of the gate which faces the cover is thus preferably contoured.

Preferably, in this embodiment, the mold cavity has indentations which are adapted to the gates for at least partial receiving of the gates. In this way the gates can be fitted to the contour of the mold cavity by means of folding down.

According to a particular embodiment the edges of the gates are provided with a contour section. This contour section is made up, for example, of a chamfering, a rounding off or a reinforcement with a circular or oval cross-section. With the aid of such reinforcements ventilation ducts are produced in the seat cushion. In cases of smaller reinforcement cross-sections rigid materials can be used; in cases of larger cross-sections it can be more favorable to provide tubular inflatable formations which are emptied before the ejection process for the purpose of enabling the finished cushion to be released more easily.

According to another particular embodiment, rollers are arranged on the upper edges of the gates. These rollers afford the advantage that the cover unwinds on the rollers during vacuum shaping, and thus only a small degree of friction occurs. This promotes fitting in conformity with the contour.

It is also self-evident that fixed gates can also be arranged in the mold cavity in some cases, i.e. in particular, at points where the cover is placed level without complex geometry. Finally, it is frequently adequate to avoid a large number of small creases at corners of the cushions, for a fixed gate to be placed in each corner with the result that, in each case, a deep fold is inserted.

According to another particular embodiment a clamping device is allocated to the gates which device has clamping jaws which act in each case against the gate on both sides. By means of these jaws the cover can be preset and/or placed on the gates. After the subsequent application of the vacuum the clamping jaws are removed again in order that the foamable reaction mixture can be charged into the mold cavity.

It is possible to design the device in such a way that the gates and the gear and optionally suction boxes can be used for several interchangeable form tools, by arranging said parts on a form tool closure. This embodiment is especially advantageous when a filled form tool can be removed during the early curing stage of the foam (in cases where the expanding reaction mixture has relatively long curing periods) and another can be placed on top of the gates. In this way the industrial expenditure is kept low and/or time is saved. It is self-evident that each form tool can have its own gates, together with a gear and a control device. The embodiment which is selected is a question of the economic considerations arising in each application.

In FIG. 1 the device consists of a mix head 1 which is indicated and is arranged over a form tool 2.

The mix head 1 is a part of a mixing device which is not represented and also includes supply containers from which feed pipes lead to mix head 1 via metering pumps. Form tool 2 has a mold cavity 3. The floor 4 of form tool 2 is provided with slits 5 through which gates 6 are guided into mold cavity 3. A suction removal box 7 is placed underneath form tool 2 and provides suction by means of slits 5 and other aspiration holes 8. A suction removal pipe 10 which leads to a vacuum generator 9 is connected to suction removal box 7. In suction removal box 7 parts of a gear 11 for gates 6 are mounted. Gear 1 is made up of a hydraulically operated piston cylinder unit 12 which moves a panel 13 on which the linearly guided gates 6 are rigidly mounted and positioned in slits 5. The upper edges of gates 6 are provided with contour sections 14 which have a circular cross-section and/or an oval cross-section. Hydraulic pipes 15, 16 which are connected to a hydraulic unit which is indicated in the form of a block 17, form part of gear 11. Hydraulic unit 17 is coupled to a control apparatus 19 by means of a pulse line 18. A textile cover 20 is inserted into mold cavity 3. A tentering frame 21 is provided on top of form tool 2 for the introduction of the cover. After the reaction mixture has been charged, which mixture forms soft polyurethane foam from polyol and isocyanate, the form tool is closed with an upper mold half which is not represented and it is not opened until after the foam core has cured.

Figure 3:
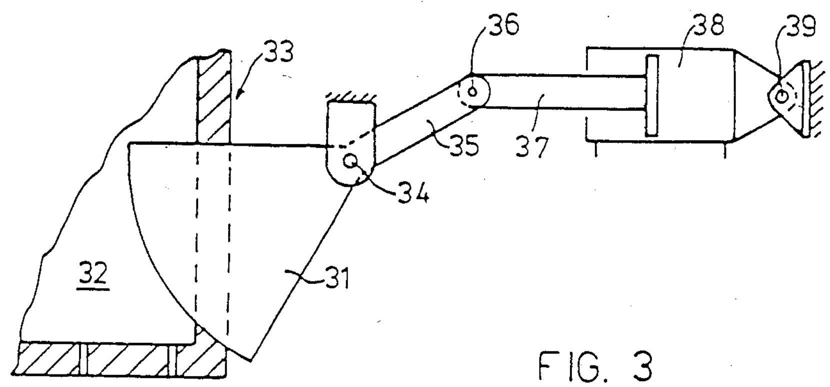
FIG. 3 is a sectional view of the apparatus through section line 2—2 in FIG. 2.
Figure 2:
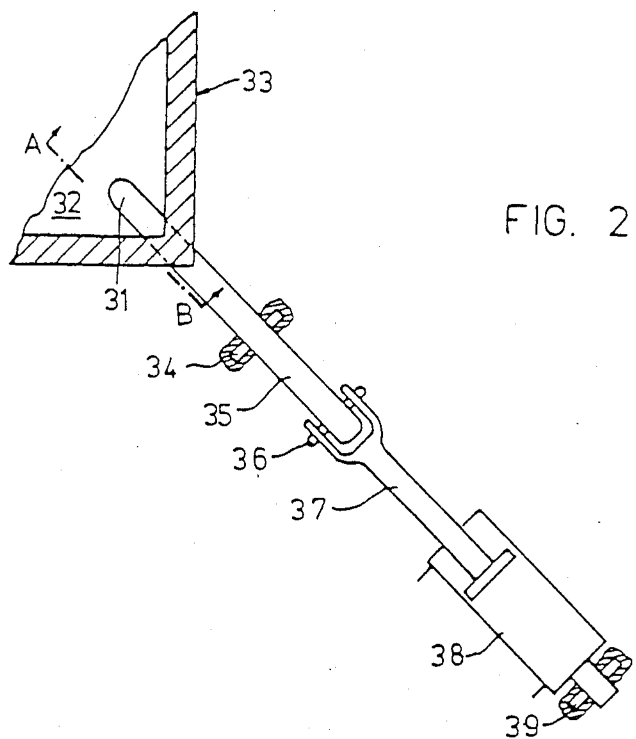
FIG. 2 represents a second embodiment of the apparatus in a plane view.

In FIGS. 2 and 3 a gate 31 which is shaped in the manner of an arc of a circle projects from the side into the corner of mod cavity 32 of an indicated form tool 33 at an angle of 45°. This gate 31 is mounted so that it can be swivelled around a fixed transverse pin 34. On the other side of transverse pin 34 gate 31 runs out into a lever 35, the end of which is connected to a piston rod 37 of a hydraulic piston cylinder unit 38 by means of a joint 36. The latter is seated so that it can be swivelled by means of a fixed pin 39. For the sake of clarity the illustration of other details has been omitted.

Figure 4:
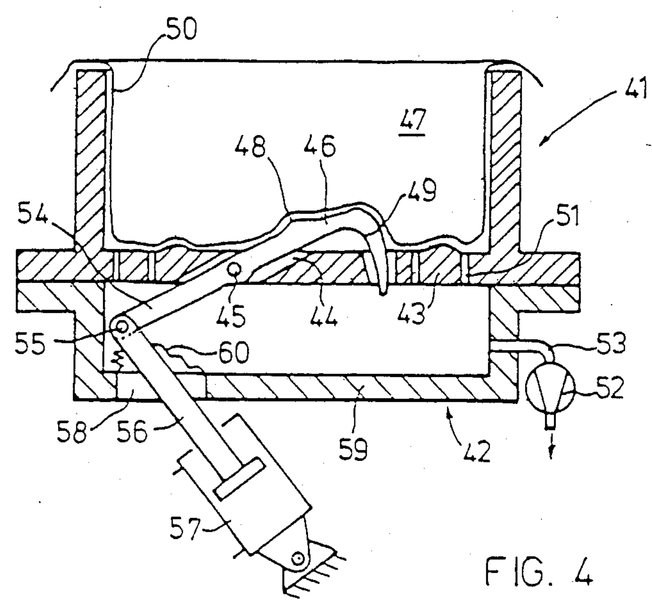
FIG. 4 represents a sectional view of the apparatus according to a third embodiment.

In FIG. 4 the device is made up of form tool 41 under which suction box 42 is fitted. In floor 43 of form tool 41 a gate 46 is placed which can be swivelled around a longitudinal pin 45, in an indentation 44. (The greatest extension of the gate goes into the drawing plane). On the lateral surface which faces mold cavity 47, gate 46 has contouring 48. At the end of gate 46 an arched plate 49 is placed which obviate the need for the clamping in of the inserted cover 50 when flap-like gate 46 is moved back between the gate and floor 43. Floor 43 is provided with suction openings 51. A suction pipe 53 which leads to a vacuum generator 52 is connected onto suction box 42. The section of gate 46 which section is positioned in each case on fixed pin 45 is designed as lever 54 and is connected to piston rod 56 of a hydraulic piston cylinder unit 57 which is pivotally mounted by means of a joint 55. Piston rod 56 is run through an opening 58 in floor 59 of suction box 42 and sealed by means of bellows 60.

Figure 5:
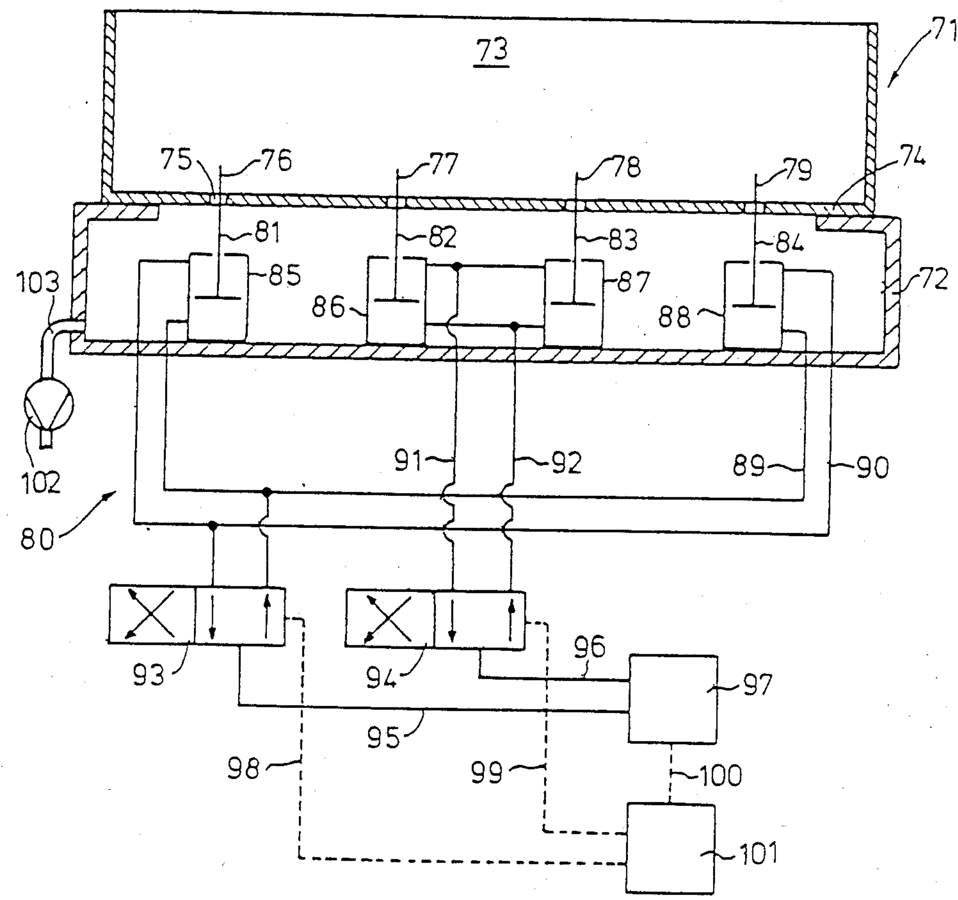
FIG. 5 represents a sectional view of the apparatus according to a fourth embodiment and FIG. 6 shows a particular embodiment of the gates.

In FIG. 5 the device is made up of form tool 71, a suction box 72, gates 76, 77, 78, 79 which project into mold cavity 73 through slits 75 provided in floor 74 of form tool 71, a gear 80 which is allocated to these gates 76, 77, 78, 79 and a control device 101. Gates 76, 77, 78, 79 pass into piston rods 81, 82, 83, 84 of hydraulic piston cylinder units 85, 86, 87, 88. These are placed on the floor 74 of suction removal box 72. Gates 76, 79 with piston cylinder units 85, 88 and gates 77, 78 with piston cylinder units 86, 87 respectively form an independent group, and each group is connected with a separate control valve 93, 94 by means of hydraulic pipes 89, 90 and/or 91, 92. Each of these control valves 93, 94 is connected to a hydraulic unit 97 (which is represented as a block and is made up of a hydraulic pump and a hydraulic reservoir) by means of hydraulic lines 95, 96. Control valves 93, 94 and hydraulic unit 97 are also connected to a control device 101 by means of pulse lines 98, 99, 100. A vacuum generator designated 102 and the suction pipe which runs from suction box 72 to the latter is designated 103.

Figure 6:
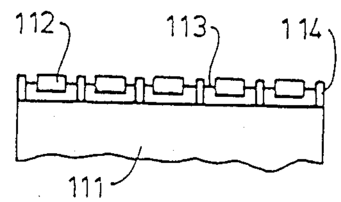

In FIG. 6 the upper edge of gate 111 is provided with rollers 112 which are held in bearings 114 by means of shafts 113.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An apparatus for the production of foam cushions having a textile cover, said apparatus comprising a mold having a fixed floor and walls which define a mold cavity, said apparatus further comprising vacuum means, which are outside said mold and said mold cavity, for applying a vacuum to said mold cavity through holes which extend through said mold and between said mold cavity and said vacuum means, said apparatus having one or more gates which extend into said mold cavity from the fixed floor or walls and means for moving said one or more gates in relation to both the fixed floor and walls of said mold, said apparatus additionally comprising a cover and means for introducing a foamable reaction mixture into said mold cavity.

2. The apparatus of claim 1 which comprises means for moving said one or more gates in a linear manner.

3. The apparatus of claim 1 wherein said one or more gates are moved through slits arranged in the wall and/or the floor of said form tool.

4. The apparatus of claim 1 wherein the edges of said one or more gates are contoured.

5. The apparatus of claim 1 which comprises more than one gate and common gear means for moving all of said gates.

6. The apparatus of claim 5 which additionally comprises control means for controlling said common gear means such that said gates may be moved together, in groups or individually.

* * * * *